(12) United States Patent
Gangloff et al.

(10) Patent No.: US 12,292,242 B2
(45) Date of Patent: May 6, 2025

(54) SURFACE TEXTURE ENHANCED GLASS-CERAMIC MATRIX COMPOSITE HEAT EXCHANGER

(71) Applicant: Hamilton Sundstrand Corporation, Charlotte, NC (US)

(72) Inventors: John Joseph Gangloff, Middletown, CT (US); Paul Sheedy, Bolton, CT (US); Justin B. Alms, Coventry, CT (US); Kathryn L. Kirsch, Manchester, CT (US); Thomas M. Yun, Glastonbury, CT (US); Daniel A. Mosher, Glastonbury, CT (US); John E. Holowczak, South Windsor, CT (US); Ram Ranjan, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 307 days.

(21) Appl. No.: 17/825,690

(22) Filed: May 26, 2022

(65) Prior Publication Data

US 2023/0384044 A1 Nov. 30, 2023

(51) Int. Cl.
*F28F 21/04* (2006.01)
*C03B 19/02* (2006.01)
*C03B 19/06* (2006.01)
*C03C 14/00* (2006.01)

(52) U.S. Cl.
CPC ............ *F28F 21/04* (2013.01); *C03B 19/025* (2013.01); *C03B 19/063* (2013.01); *C03C 14/002* (2013.01); *C03C 2214/02* (2013.01); *C03C 2214/20* (2013.01); *C03C 2214/30* (2013.01); *C03C 2214/34* (2013.01)

(58) Field of Classification Search
CPC ...... F28F 21/04; F28F 2255/06; F28F 21/006; C03B 19/025; C03C 14/002; C03C 2214/02; C04B 35/80
See application file for complete search history.

(56) References Cited

U.S. PATENT DOCUMENTS

| | | | |
|---|---|---|---|
| 4,428,763 A | 1/1984 | Layden | |
| 6,627,019 B2 | 9/2003 | Jarmon et al. | |
| 7,452,189 B2 | 11/2008 | Shi et al. | |
| 8,048,383 B2 | 11/2011 | Tonkovich et al. | |
| 8,545,938 B2 | 10/2013 | Schmidt et al. | |
| 8,721,974 B2 | 5/2014 | Tonkovich et al. | |
| 8,899,308 B2 | 12/2014 | Beutler et al. | |
| 2003/0042005 A1* | 3/2003 | Sagal .................. | F28D 15/0275 361/689 |
| 2009/0004425 A1 | 1/2009 | Lehman et al. | |

(Continued)

OTHER PUBLICATIONS

Extended European Search Report dated Sep. 25, 2023, for corresponding European Patent Application No. 23170171.5.

*Primary Examiner* — Henry T Crenshaw
*Assistant Examiner* — Kamran Tavakoldavani
(74) *Attorney, Agent, or Firm* — Kinney & Lange, P.A.

(57) ABSTRACT

A method of manufacturing a heat exchanger core from glass ceramic matrix composite includes placing one or more reinforcing fibers around one or more mandrels into a mold cavity. A glass matrix material infiltrates the one or more reinforcing fibers to produce an infiltrated core and the one or more mandrels is removed to create one or more passages passing through the infiltrated core.

9 Claims, 6 Drawing Sheets

(56) References Cited

U.S. PATENT DOCUMENTS

| | | |
|---|---|---|
| 2012/0125585 A1 | 5/2012 | Morrison et al. |
| 2015/0045200 A1 | 2/2015 | Schmidt et al. |
| 2017/0234629 A1* | 8/2017 | Schmidt ............... F25B 13/00 |
| | | 62/498 |
| 2020/0292250 A1* | 9/2020 | Sienel ................ F28F 9/0135 |
| 2021/0245246 A1 | 8/2021 | Lara-Curzio et al. |
| 2021/0339515 A1 | 11/2021 | Holowczak et al. |
| 2022/0073399 A1 | 3/2022 | Gangloff et al. |
| 2022/0152959 A1* | 5/2022 | Bieler .................. B32B 37/18 |

* cited by examiner

SURFACE TEXTURE ENHANCED GLASS-CERAMIC MATRIX COMPOSITE HEAT EXCHANGER

STATEMENT OF GOVERNMENT INTEREST

This invention was made with government support under contract number DE-AR0001122 awarded by The Department of Energy. The government has certain rights in the invention.

BACKGROUND

This disclosure relates generally to heat exchangers and more particularly to heat exchangers made from Ceramic Matrix Composite (CMC).

Heat exchangers are made of many different types of materials. CMC heat exchangers are particularly useful in high temperature environments. However, CMC materials can have a low thermal conductivity, reducing the efficiency of CMC heat exchangers. Therefore, a method of augmenting and enhancing heat transfer in CMC heat exchangers is desired.

SUMMARY

In one embodiment, a method of manufacturing a heat exchanger core from glass ceramic matrix composite, wherein the method includes placing one or more reinforcing fibers around one or more mandrels into a mold cavity. A glass matrix material infiltrates the one or more reinforcing fibers to produce an infiltrated core and the one or more mandrels are removed to create one or more passages passing through the infiltrated core.

In another embodiment, a heat exchanger includes one or more tubular regions, and each tubular region of the one or more tubular regions includes a passage with a radially inner surface and a radially outer surface. One or more reinforcing fibers is between the radially inner surface and the radially outer surface of each tubular region. A glass matrix material infiltrates the one or more reinforcing fibers. A first pattern is formed into the radially inner surface of each tubular region and a second pattern is formed into the radially outer surface of each tubular region.

DETAILED DESCRIPTION

This disclosure relates to a heat exchanger made from Ceramic Matrix Composite (CMC) materials, and in particular to heat exchangers formed of Glass Ceramic Matrix Composite (G-CMC) materials. The heat exchanger has surface features formed from G-CMC materials. The surface features can be protrusions or indentations either internally or externally which break up the flow boundary layer and increase flow turbulence, thereby increasing heat transfer in the heat exchanger. The heat exchanger will be discussed below with reference to FIGS. 1-5.

Figure 1:
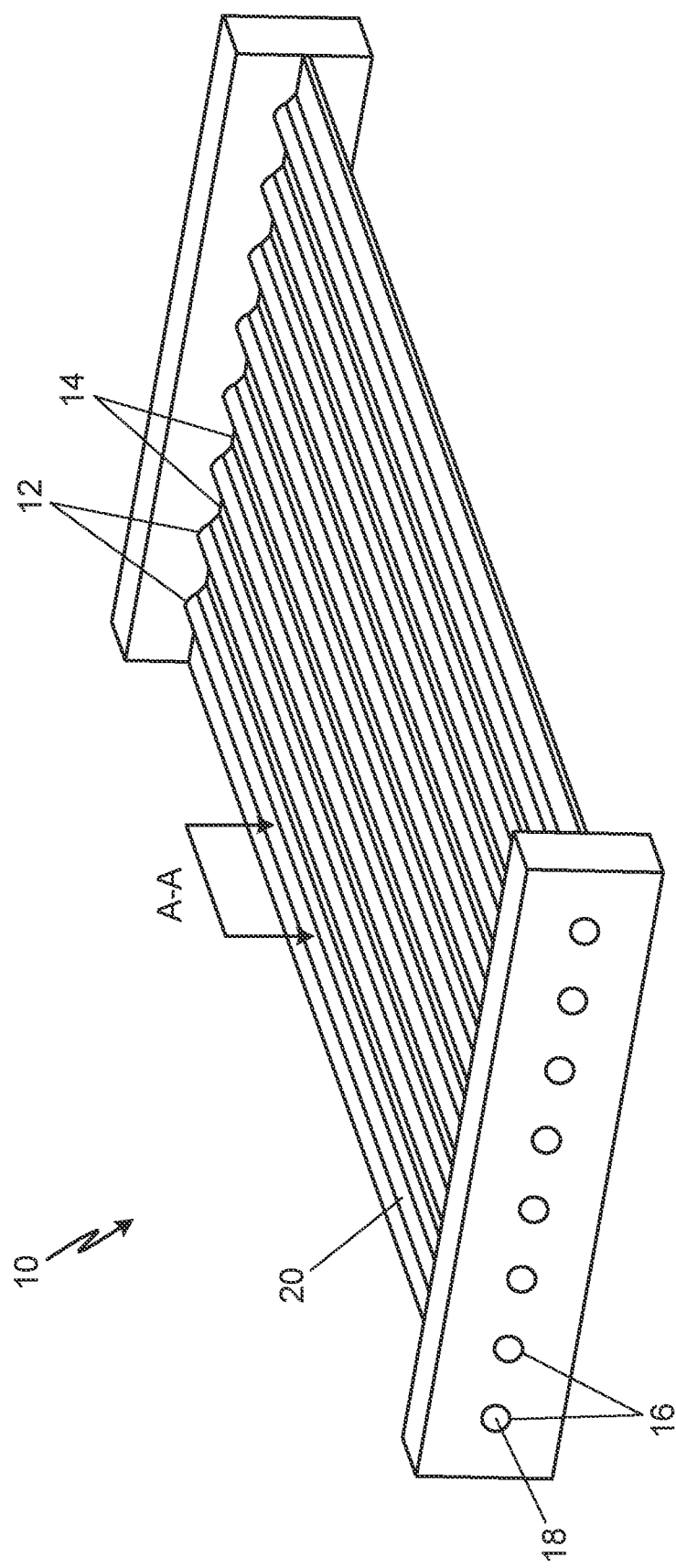
FIG. 1 is a perspective view of an embodiment of a tube sheet heat exchanger.

FIG. 1 is a perspective view of an embodiment of tube sheet heat exchanger 10 formed from G-CMC materials. Tube sheet heat exchanger 10 comprises tubular regions 12, flat regions 14, and passageways 16. Passageways 16 comprises radially inner part surface 18 and radially outer part surface 20.

Tube sheet heat exchanger 10 transfers heat from a first fluid to a second fluid. The first fluid can be at a higher temperature than the second fluid or vice-versa. The first fluid flows over radially outer part surface 20. The second fluid flows through passageways 16 and contacts radially inner part surface 18. The first fluid flows at an angle relative to the second fluid. The angle can be between 0 and 180 degrees. Tubular regions 12 are spaced apart from one another by flat regions 14 and form raised regions between flat regions 14. In some embodiments flat regions 14 are wide. In alternative embodiments, flat regions 14 are substantially narrow. Alternatively, tubular regions 12 can directly abut each other, thus flat regions 14 would substantially not be present. Tubular regions 12 house passageways 16. Tubular regions 12 are the regions where heat transfer from the first fluid to the second fluid primarily occurs. When present, some heat transfer occurs in flat regions 14.

Figure 2B:
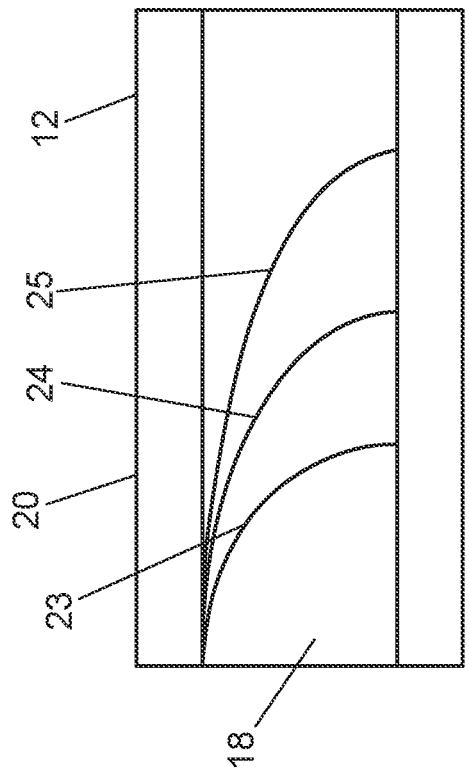
FIG. 2B is a cross sectional view of a passageway of the tube sheet heat exchanger of FIG. 1 along line A-A with grooved indentations.
Figure 2A:
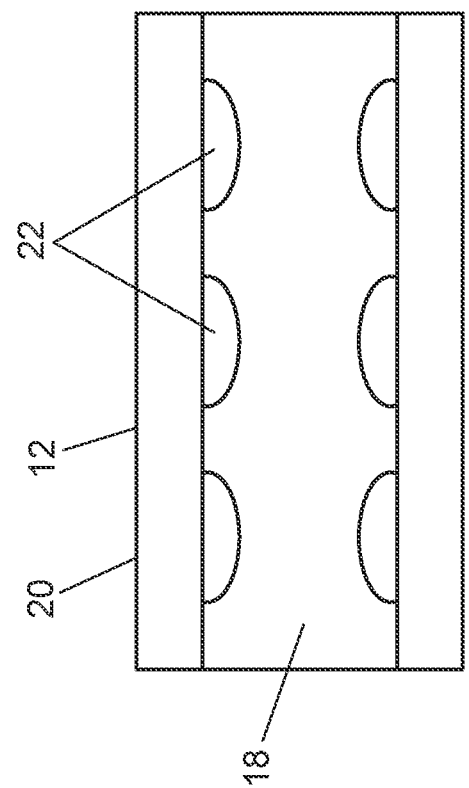
FIG. 2A is a cross sectional view of a passageway of the tube sheet heat exchanger of FIG. 1 along line A-A with protrusions.

FIGS. 2A-2B each disclose a cross-sectional view of an embodiment of passageways 16 of tube sheet heat exchanger 10 and will be discussed together. FIG. 2A is a cross-sectional view of passageway 16 of tube sheet heat exchanger 10 of FIG. 1 taken along line A-A with protrusions 22. FIG. 2A includes radially inner part surface 18, radially outer part surface 20, and protrusions 22. FIG. 2B is a cross-sectional view of passageway 16 of tube sheet heat exchanger 10 of FIG. 1 taken along line A-A, except passageway 16 comprises grooved indentations 23, 24, or 25 instead of protrusions 22. FIG. 2B includes radially inner part surface 18, radially outer part surface 20, and grooved indentations 23, 24, or 25.

On radially inner part surface 18 of passageways 16 a first pattern is formed. In the embodiment of FIG. 2A, the first pattern is formed by protrusions 22. In the embodiment of FIG. 2B, the first pattern is formed by grooved indentations 23, 24, or 25. Grooved indentation 23 has a tight tread spacing whereas grooved indentation 25 has a wide tread spacing. Grooved indentation 24 has a tread spacing between the tight tread spacing of grooved indentation 23 and the wide tread spacing of grooved indentation 25. In other embodiments, the first pattern can be a combination of grooved indentations 23, 24, and 25. In other embodiments, the first pattern can be a combination of protrusions 22 and grooved indentations 23, 24, or 25 together in the same passageway 16. The first pattern can further be any combination of protrusions and/or indentations which modulate a flow of a fluid through passageway 16. Modulation of the flow of the fluid through passageway 16 increases heat transfer from radially inner part surface 18 into the G-CMC material with the heat then conducting to radially outer part surface 20. Modulation of the flow can include breaking up the flow boundary layer and/or inducing mixing and turbulence within passageway 16, thereby in some cases changing a substantially laminar flow to a substantially turbulent flow.

Breaking up the flow boundary layer can lead to flow disruption and increased mixing. Further, if turbulent flow is induced heat transfer can occur even more readily as turbulent flow does not have an insulating layer along the radially inner part surface 18.

Protrusions 22 create turbulent flow by protruding into a flow column in passageway 16 thereby interrupting the flow along radially inner part surface 18. Grooved indentations 23, 24, or 25 also create turbulent flow within passageway 16 by altering flow nearest radially inner part surface 18, thereby disrupting the overall flow column in passageway 16. A tighter tread spacing can disrupt the overall flow column more than a wider tread spacing, however this further increases the pressure drop across the passageway 16 Both protrusions 22 and grooved indentations 23, 24, or 25 alter flow nearest radially inner part surface 18, disrupting the insulation layer which forms in laminar flow. Additionally, both protrusions 22 and grooved indentations 23, 24, or 25 can be formed on radially outer part surface 20.

Figure 3A:
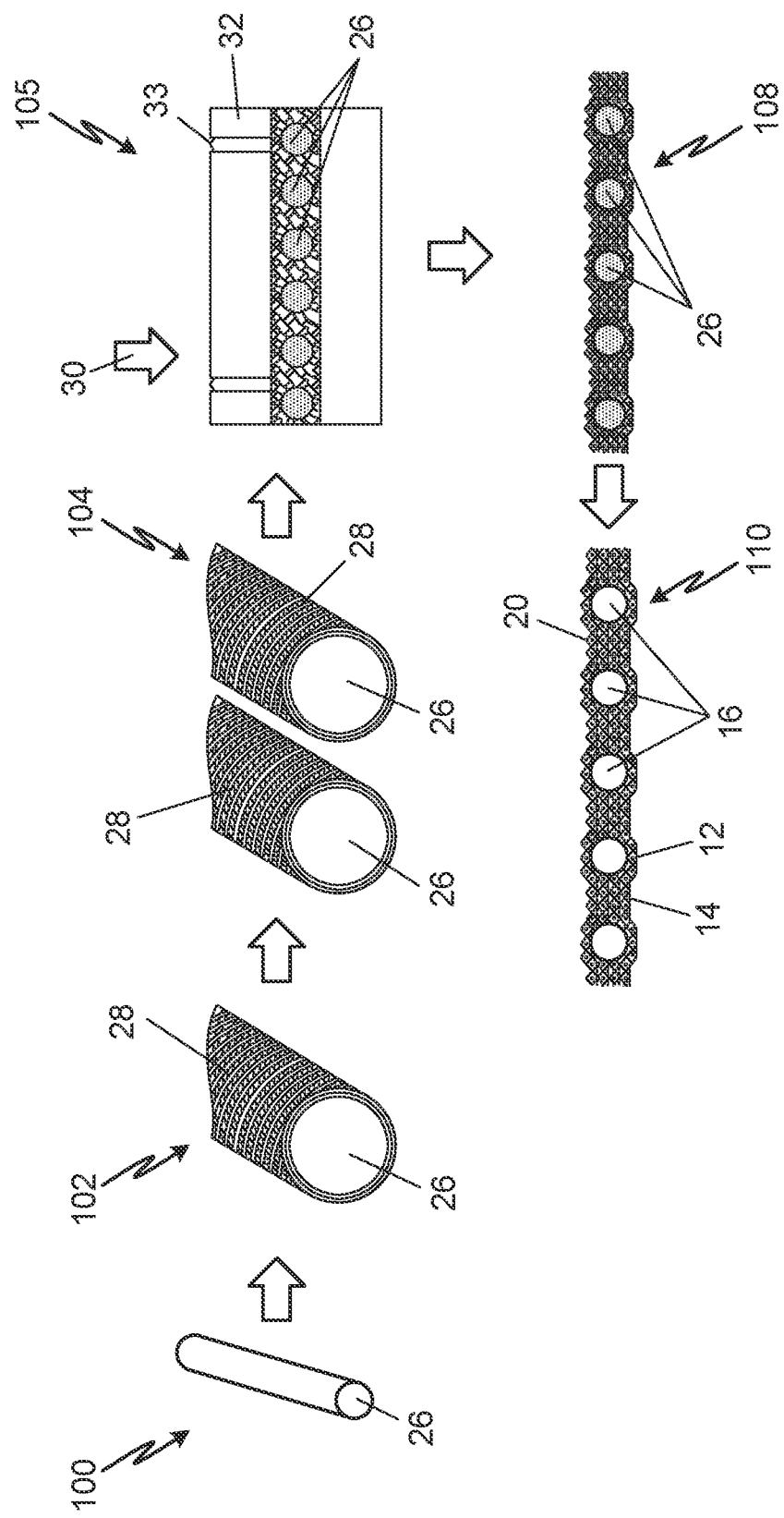
FIG. 3A is a flow diagram of the heat exchanger of FIG. 1 being manufactured using injection molding.
Figure 3B:
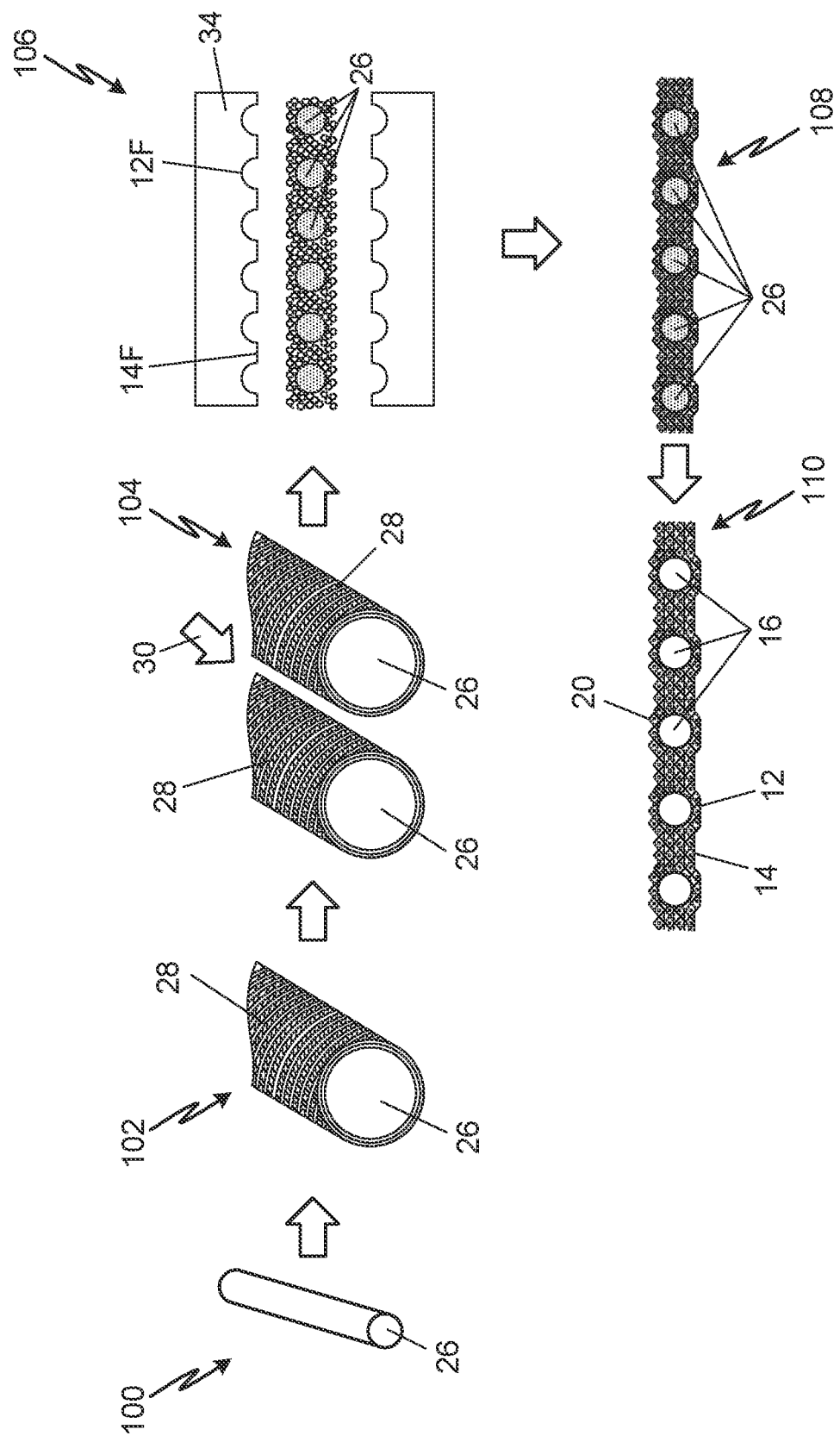
FIG. 3B is a flow diagram of the heat exchanger of FIG. 1 being manufactured using hot pressing.

FIGS. 3A and 3B each disclose an embodiment of forming a G-CMC component and will be discussed together. FIG. 3A is flow diagram of G-CMC component being manufactured using mold 32 with injection sites 33 therein. The flow diagram of FIG. 3A includes the steps of providing mandrel 26, forming fiber preform 28 around mandrel 26, injecting fiber preform 28 with glass matrix material 30, removing mandrels 26, and providing the finalized G-CMC component. The flow diagram of FIG. 3B includes the steps of providing mandrel 26, forming fiber preform 28 around mandrel 26, infiltrating fiber preform 28 with glass matrix material 30, hot pressing fiber preform 28 with die set 34, removing mandrels 26, and providing the finalized G-CMC component.

As shown in FIGS. 3A and 3B, first step 100 in a possible embodiment of manufacturing the G-CMC component is providing mandrel 26 to a build surface. In some embodiments, the build surface can be mold 32. In the embodiments of FIGS. 3A and 3B, mandrel 26 is formed of graphite. In alternative embodiments, mandrel 26 can be formed of any material know to those of skill in the art to be chemically inert with chosen substate 30. Mandrel 26 can have the first pattern discussed above with reference to FIGS. 2A and 2B formed in negative on an outer tooling surface of mandrel 26. The first pattern can include tooling surface protrusions or indentations which will form part surface indentations or protrusions, respectively, on radially inner part surface 18 of passageways 16.

As shown in FIGS. 3A and 3B, second step 102 of manufacturing the G-CMC component is forming fiber preform 28 around mandrel 26. Fiber preform 28 provides a surface for glass matrix material 30 to adhere too. Fiber preform 28 also provides reinforcement and improves mechanical properties of the G-CMC component. Specifically, fiber preform 28 can increase a tensile strength of the G-CMC component and increase a heat transfer coefficient of the G-CMC component from radially inner part surface 18 to radially outer part surface 20. In the embodiment of FIGS. 3A and 3B, fiber preform 28 is formed of one or more ceramic fibers formed around the mandrel. In alternative embodiments fiber preform 28 can be formed of any fibers which are crystalline and compatible with to glass matrix material 30. In alternative embodiments, fiber preform 28 can be silicon carbide, carbon, oxides, or combinations thereof. In alternative embodiments fiber preform 28 can be oriented in circumferential directions, linear directions, or random directions. In alternative embodiments fiber preform 28 can be formed from a plurality of chopped fibers. In alternative embodiments fiber preform 28 can be a single continuous thread wrapped and woven into layers.

As shown in FIGS. 3A and 3B, third step 104 of the embodiment of FIGS. 3A and 3B of manufacturing the G-CMC component is positioning mandrels 26 with fiber preform 28 thereon next to each other on the build surface, if there is more than one mandrel. Additional fiber preform 28 can be positioned between mandrels 26 to connect mandrels 26 together. As shown in FIG. 3B. glass matrix material 30 is then distributed in fiber preforms 28.

In the embodiment of FIG. 3B glass matrix material 30 is glass. In alternative embodiments, glass matrix material 30 can be any material which hardens when cooled and which does not destroy fiber preform 28 and mandrels 26. In alternative embodiments, glass matrix material 30 can include pure glass, silicone carbide, molten silicon, and combinations thereof. When hardened glass matrix material 30 and fiber preform 28 have a porosity of less than 10%, less than 5%, less than 3%, or less than 1%. Due to the low porosity, a distance between radially inner part surface 18 and radially outer part surface 20 can be reduced which improves heat transfer characteristics. Further, since the porosity is lower, increased control over surface roughness is possible. Specifically, surface roughness control with resolutions of less than 0.3 mm, less than 0.1 mm, and less than 0.03 mm are possible.

As shown in FIG. 3A, injection step 105 of the embodiment of FIG. 3A of manufacturing the G-CMC component is injecting molten glass matrix material 30 into mold 32 through injection sites 33. Molten glass matrix material 30 infiltrates the spaces between fiber preform 28, thereby forming an infiltrated core of the G-CMC component. Before injecting molten glass matrix material 30, a pressure is applied to compact fiber preform 28. Compacting fiber preform 28 reduces the space between fibers of fiber preform 28 thereby decreasing a porosity of the G-CMC component. A temperature of mold 32 is also increased. Increasing the temperature of mold 32 allows for glass matrix material 30 to flow more readily, thereby further decreasing a porosity of the G-CMC component. After the fiber preform 28 has been compacted and mold 32 has been heated, molten glass matrix material 30 is then injected into mold 32 through injection sites 33. Injection sites 33 can be one-way valves to increase a pressure of the injected molten glass matrix material 30. When glass matrix material 30 hardens, glass matrix material 30 and fiber preform 28 will take the shape of mold 32. Mold 32 can be flat. Mold 32 can be textured. The texture on mold 32 can comprise protrusions or indentations. The plurality of protrusions can comprise a plurality of fins (not shown). The plurality of fins increases a surface area which interacts with the first fluid, breaks up the flow boundary, and/or induces turbulence in a flow of the first fluid. Mold 32 can be formed from graphite or any other material that does not destroy glass matrix material 30 and capable of handling the high temperatures of glass matrix material 30.

In the embodiment of FIG. 3A glass matrix material 30 is glass. In alternative embodiments, glass matrix material 30 can be any material which hardens when cooled and which does not destroy fiber preform 28 and mandrels 26. In alternative embodiments, glass matrix material 30 can include pure glass, silicone carbide, molten silicon, and combinations thereof. When hardened glass matrix material 30 and fiber preform 28 have a porosity of less than 10%, less than 5%, less than 3%, or less than 1%. Due to the low porosity, a distance between radially inner part surface 18 and radially outer part surface 20 can be reduced which improves heat transfer characteristics. Further, since the porosity is lower, increased control over surface roughness is possible. Specifically, surface roughness control with resolutions of less than 0.3 mm, less than 0.1 mm, and less than 0.03 mm are possible.

As shown in FIG. 3B, pressing step 106 of the embodiment of FIG. 3B of manufacturing the G-CMC component comprises hot pressing infiltrated fiber preform 28 with die set 34. Prior to hot pressing fiber preform 28, a powdered version of glass matrix material 30 must be placed onto fiber preform 28. Once the powdered version of glass matrix material 30 is placed onto fiber preform 28 a temperature is increased which melts the powdered version of glass matrix material 30. After the glass matrix material 30 has been melted, then a pressure can be applied by die set 34, thereby hot-pressing fiber preform 28. The melting and applied pressure removes small bubbles in glass matrix material 30 between fibers of fiber preform 28 thereby decreasing a porosity of the G-CMC component.

Die set 34 can have a second pattern formed into contact surfaces of die set 34. As shown in FIG. 3B, the second pattern can have tubular form 12F and flat form 14F. The second pattern as shown in FIG. 3B decreases a thickness between radially inner part surface 18 of passageway 16 and radially outer part surface 20, increasing heat transfer. The second pattern also forms tubular portions 12 and flat portions 14 in outer part surface 20. The second pattern can further include a textured surface. The textured surface can include protrusions or indentations. The protrusions can include a plurality of fins (not shown) which protrude from tubular region 12 and flat region 14. The plurality of fins increases a surface area which interacts with the first fluid, breaks up the flow boundary, and/or induces turbulence in a flow of the first fluid. The textured surface can alternatively or in addition include a roughened surface. The roughened surface has a finer length scale than the textured surface. The roughened surface can be uniform. The roughened surface of radially outer part surface 20 has an RMS surface roughness of at least 3×, of least 5×, of at least 10×, or at least 20× of the surface prior to hot pressing with die set 34. A possible embodiment comprises a surface which can be considered nominally smooth with 0.001" deviations, therefore a roughened surface after hot pressing with deviations of up to 0.020" may have a surface roughness of 20× the surface prior to hot pressing. Protrusions 22 and grooved indentations 23, 24, or 25 can be larger than the deviations created by hot pressing with die set 34 or the texture created by mold 32. Specifically, a height of protrusions 22 and grooved indentations 23, 24, or 25 can be greater than 0.05," greater than 0.1", greater than 0.2", or greater than 0.3" whereas the deviations created by hot pressing with die set 34 or the texture created by mold 32 have a height of up to 0.05", up to 0.01", and up to 0.020."

Die set 34 can be manufactured with additive manufacturing. Die set 34 can also be formed from graphite. Not shown in FIG. 3B, a chemical vapor deposition process can be applied to outer part surface 20 after hot pressing with die set 34. The chemical vapor deposition process can increase a roughness of outer part surface 20.

Reinforcement particles can be hot pressed into glass matrix material 30 and fiber preform 28 as part of fourth step 106. The reinforcement particles can include local additions of secondary fibers, particulates, nanotubes, and a combination thereof. When secondary fibers are used, the secondary fibers can be at the same or different orientation as fiber preform 28. The secondary fibers can be the same or a different material than fiber preform 28. These reinforcement particles can improve the material characteristics of tube sheet heat exchanger 10 in the areas where the reinforcement particles are applied. The material characteristics which are increased include strength, stiffness, and thermal transfer characteristics. Die set 34 can be manufactured with additive manufacturing. Die set 34 can be formed from graphite.

Although injection step 105 and pressing step 106 are discussed here in separate figures, FIGS. 3A and 3B respectively, injection step 105 and pressing step 106 can be used on the same G-CMC component. Specifically, a component can be formed via injection step 105 and a surface pattern can be imparted with pressing step 106. Prior to fifth step 108, glass matrix material 30 and fiber preform 28 can be heat treated. Heat treating glass matrix material 30 and fiber preform 28 can crystalize glass matrix material 30. Crystalizing glass matrix material 30 can convert glass matrix material 30 to a ceramic and/or glass-ceramic material. Crystalizing glass matrix material 30 can increase a hardness of glass matrix material 30. Crystalizing glass matrix material 30 can also decrease a porosity of the glass matrix material 30 further.

As shown in FIGS. 3A and 3B, fifth step 108 in the embodiment of FIGS. 3A and 3B is removing mandrels 26. Mandrels 26 can be removed via chemical or mechanical means. Chemical removal can include oxidization. When mandrels 26 are formed of graphite, mandrels 26 can be oxidized away via a burning process. Mechanical removal of mandrels 26 can include sonication, electrical discharge machining, or a combination thereof. Mandrels 26 can be removed by any other method known to those of skill in the art of removing a sacrificial component from within another component.

As shown in FIGS. 3A and 3B, after completion of fifth step 108, manufacturing of the G-CMC component is completed, as represented by reference 110. With completion 110 of the G-CMC component, the G-CMC component is ready for installation into any larger assembly. Specifically, any larger assembly where heat must be transferred from a first fluid to a second fluid.

The above steps 100-110 were described with reference to a G-CMC component. Steps 100-110 can likewise be utilized when forming tube sheet heat exchanger 10. Steps 100-110 can further be utilized when forming shell and tube heat exchanger 52 (discussed below with reference to FIG. 5) or any other heat exchanger with a first and a second passageway. The steps 100-110 can further be used for any other G-CMC components. The method described above with reference to steps 100-110 can be particularly useful for any G-CMC component which experiences high temperatures.

Figure 4A:
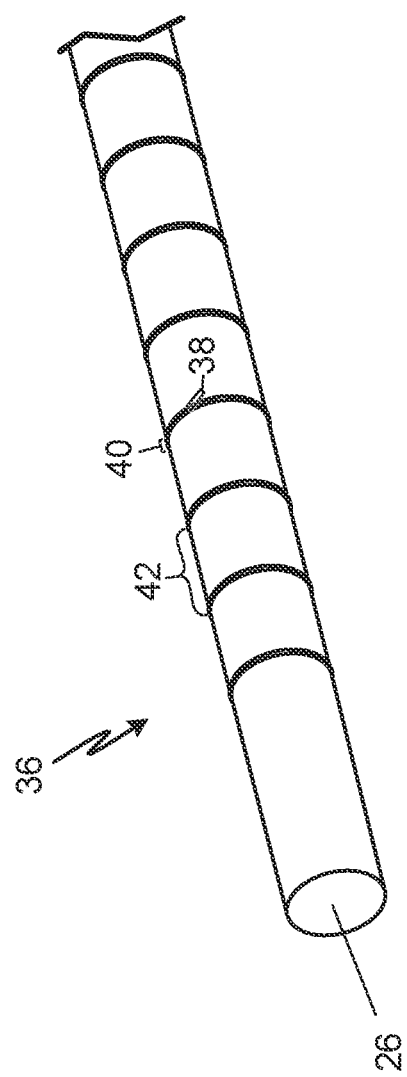
FIG. 4A is a perspective view of a mandrel for forming protrusions in a heat exchanger.
Figure 4B:
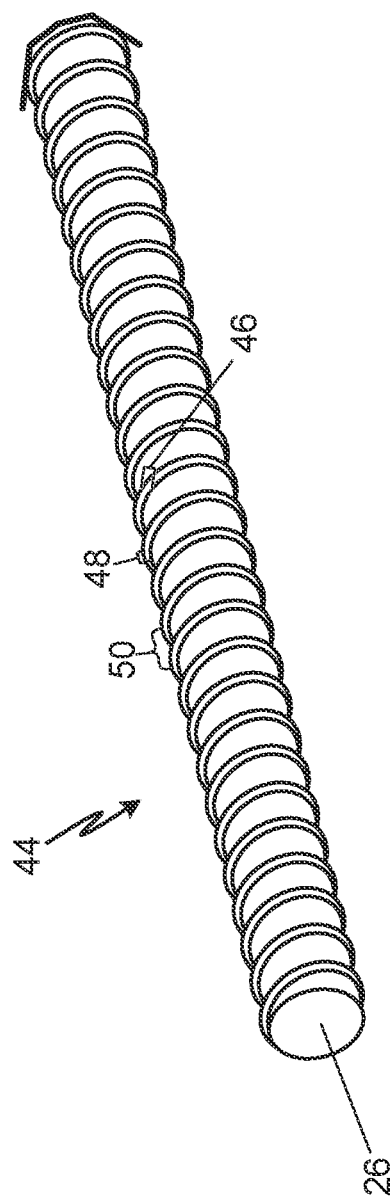
FIG. 4B is a perspective view of a mandrel for forming grooved indentations in a heat exchanger.

FIGS. 4A-4B disclose embodiments of mandrels 26 for forming a first pattern. FIG. 4A is a perspective view of an embodiment of mandrel 26 for forming protrusions 22 in passageways 16 of a heat exchanger. FIG. 4B is a perspective view of an embodiment of mandrel 26 for forming grooved indentations 24 in passageways 16 of a heat exchanger.

Mandrel 26 shown in FIG. 4A forms protrusions 22 in radially inner surface 18 of passageways 16, hereinafter referred to as protrusion mandrel 36. Protrusion mandrel 36 has a plurality of protrusions. Each protrusion is a circumferential protrusion from the tooling surface. Each protrusion has protrusion height 38, protrusion width 40, and protrusion spacing 42. Protrusion height 38 is how far the protrusion extends from the tooling surface of protrusion mandrel 36. Protrusion width 40 is an axial width of the circumferential protrusion. Protrusion spacing 42 is a distance between the each of the plurality of protrusions. Each of these distances can be varied for each and between each of the plurality of protrusions. When protrusion mandrel 36 is used in the formation of protrusions 22, glass matrix material 30 infills between each of the plurality of protrusions. Protrusion spacing 42 is therefore the width of each of the of protrusions 22. Protrusions 22 are discussed further above with reference to FIG. 2A. Protrusion mandrel 36 can be formed from graphite.

Mandrel 26 shown in FIG. 4B forms grooved indentations 24 in radially inner surface 18 of passageways 16, hereinafter referred to as tread mandrel 44. Tread mandrel 44 has a single protrusion. The single protrusion extends from a tooling surface of tread mandrel 44. The single protrusion circumferentially wraps around the circumference of tread mandrel 44 a plurality of times. The single protrusion has tread height 46, tread width 48, and tread spacing 50. Tread height 46 is how far the protrusion extends from the tooling surface of tread mandrel 44. Tread width 48 is an axial width of the single protrusion. Tread spacing 50 is the distance between each of the plurality of circumferential wraps. When tread mandrel 44 is used in the formation of grooved indentations 24, glass matrix material 30 infills between each of the plurality of circumferential wraps and each of the plurality of circumferential wraps presses into the radially inner surface 18 of passageway 16 forming grooved indentations 24. A width of grooved indentations 24 is the width of tread width 48 and a depth of grooved indentations 24 is tread height 46. Grooved indentations 24 are discussed further above with reference to FIG. 2B. Tread mandrel 44 can be formed from graphite.

Figure 5:
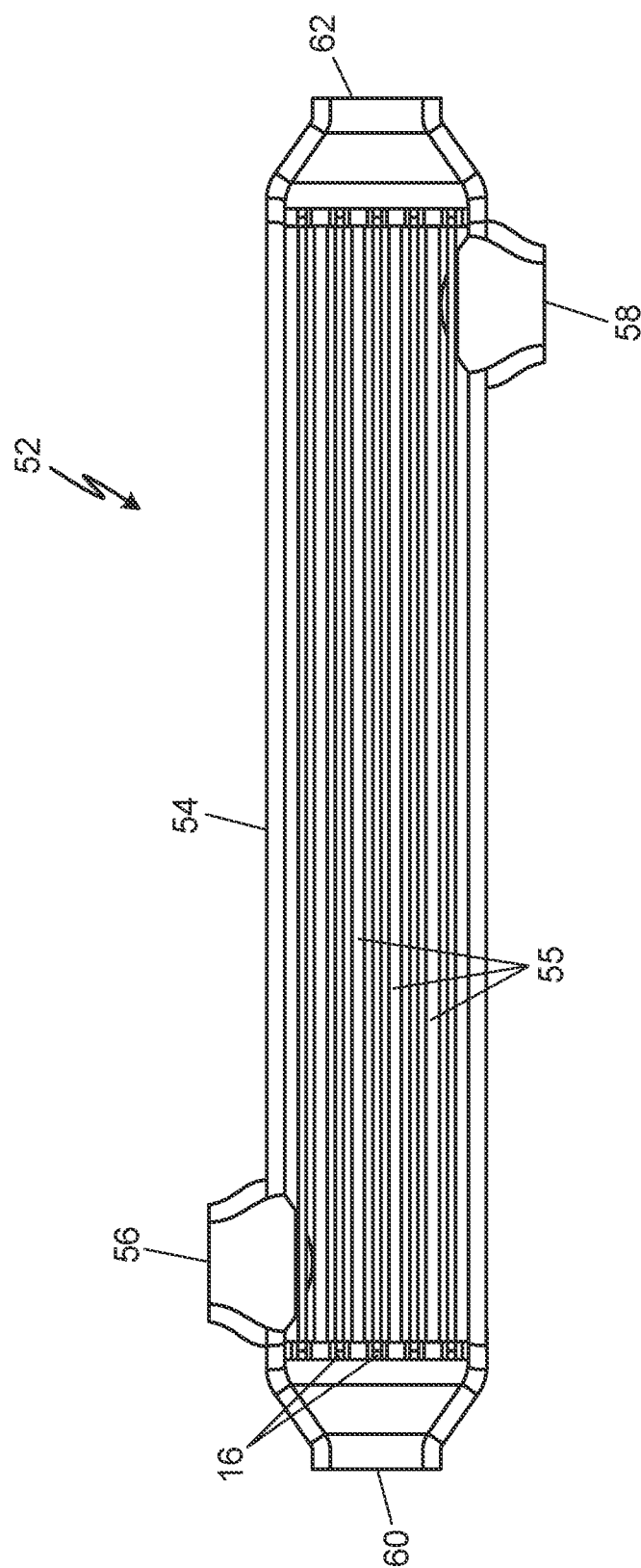
FIG. 5 is a cross sectional view of an embodiment of a shell and tube heat exchanger.

FIG. 5 is a cross sectional view of an embodiment of shell and tube heat exchanger 52. Shell and tube heat exchanger 52 includes shell 54 and tubes 55. Each of tubes 55 includes passageway 16 with radially inner surface 18 and radially outer part surface 20. Shell 54 has first and second entrances (56, 60) and first and second exits (58, 62).

Shell 54 surrounds a plurality of tubes 55. A first fluid flows from first entrance 56 to first exit 58. The first fluid flows over radially outer part surface 20 of each of tubes 55. A second fluid fluids from second entrance 60 to second exit 62. The second fluid flows through the plurality of passageways 16 inside of tubes 55. Each of the plurality of passageways 16 can have a first pattern on radially inner surface 18. The first pattern can be protrusions 22, grooved indentations 24, or any other combination of protrusions and indentations as discussed above with respect to FIGS. 2A-2B. Radially outer part surface 20 can have a second pattern. The second pattern can be a plurality of fins, a rough surface, or any combination of protrusions, indentations, and roughened surfaces as discussed above with respect to FIG. 3. Shell 54 and tubes 55 can be formed from G-CMC through a manufacturing process similar to the process described above with reference to FIG. 3.

Discussion of Possible Embodiments

The following are non-exclusive descriptions of possible embodiments of the present invention.

A method of manufacturing a heat exchanger core from glass ceramic matrix composite.

The method of manufacturing a heat exchanger core from glass ceramic matrix composite of the preceding paragraph can optionally include, additionally and/or alternatively, any one or more of the following features, configurations and/or additional components: placing one or more reinforcing fibers around one or more mandrels into a mold cavity, infiltrating the one or more reinforcing fibers with a glass matrix material to produce an infiltrated core, and removing the one or more mandrels to create one or more passages passing through the infiltrated core.

A further embodiment of the foregoing method, wherein infiltrating the one or more reinforcing fibers with a glass matrix material to produce an infiltrated core includes increasing a temperature of the mold cavity to melt a reservoir of the glass matrix material, and injecting molten glass into the one or more reinforcing fibers to produce an infiltrated core.

A further embodiment of any of the foregoing methods, wherein infiltrating the one or more reinforcing fibers with a glass matrix material to produce an infiltrated core includes placing a powered glass matrix material onto the one or more reinforcing fibers, increasing a temperature of the mold cavity to melt the powered glass matrix material, and applying a pressure to the one or more reinforcing fibers to produce an infiltrated core.

A further embodiment of any of the foregoing methods, further comprising heat treating the infiltrated core, wherein heat treating the infiltrated core converts the glass matrix material to a glass-ceramic material.

A further embodiment of any of the foregoing methods, wherein the one or more reinforcing fibers are ceramic fibers.

A further embodiment of any of the foregoing methods, wherein the one or more mandrels are formed of graphite.

A further embodiment of any of the foregoing methods, wherein the one or more mandrels have one or more protrusions which form a surface texture, and the surface texture forms a patterned feature on an interior surface of the infiltrated core.

A further embodiment of any of the foregoing methods, wherein the one or more mandrels have one or more grooves which form a surface texture, and the surface texture forms a patterned feature on an interior surface of the infiltrated core.

A further embodiment of any of the foregoing methods, wherein the mold cavity has a surface texture, and the surface texture forms a patterned feature on an exterior surface of the heat exchanger core.

A further embodiment of any of the foregoing methods, wherein a porosity of the glass matrix material of the heat exchanger core is less than 5%.

A further embodiment of any of the foregoing methods, wherein removing the one or more mandrels includes oxidizing the one or more mandrels.

A heat exchanger can optionally include, additionally and/or alternatively, any one or more of the following features, configurations and/or additional components: one or more tubular regions, where each tubular region of the one or more tubular regions includes a passage with a radially inner surface and a radially outer surface. The heat exchanger can further include one or more reinforcing fibers between the radially inner surface and the radially outer surface of each tubular region and a glass matrix material infiltrating the one or more reinforcing fibers. The heat exchanger can further include a first pattern formed into the radially inner surface of each tubular region and a second pattern formed into the radially outer surface of each tubular region.

A further embodiment of the foregoing heat exchanger, wherein each tubular region is substantially parallel to an adjacent tubular region A further embodiment of any of the foregoing heat exchangers, wherein a porosity of the glass matrix material of the heat exchanger is less than 5% of a total volume of the glass matrix material.

A further embodiment of any of the foregoing heat exchangers, further includes a case enclosing the one or more tubular regions and forming a second passageway between an interior surface of the case and the outer surface of each tubular region.

A further embodiment of any of the foregoing heat exchangers, wherein the first pattern comprises a plurality of protrusions.

A further embodiment of any of the foregoing heat exchangers, wherein the first pattern comprises a plurality of treads.

A further embodiment of any of the foregoing heat exchangers, wherein the first pattern comprises a textured surface.

A further embodiment of any of the foregoing heat exchangers, wherein the second pattern comprises a plurality of fins.

A further embodiment of any of the foregoing heat exchangers, wherein the second pattern comprises a textured surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   one or more tubular regions, wherein each tubular region of the one or more tubular regions comprises:
   a passage defining a radially inner surface of the one or more tubular regions; and
   a radially outer surface;
   one or more reinforcing fibers between the radially inner surface and the radially outer surface of each tubular region;
   a glass matrix material infiltrating the one or more reinforcing fibers;
   one or more flat regions between each of the one or more tubular regions;
   a first pattern formed into the radially inner surface of each tubular region; and
   a second pattern formed into the radially outer surface of each tubular region.

2. The heat exchanger of claim 1, wherein each tubular region is substantially parallel to an adjacent tubular region.

3. The heat exchanger of claim 1, wherein a porosity of the glass matrix material of the heat exchanger is less than 5% of a total volume of the glass matrix material.

4. The heat exchanger of claim 1, further comprising:
   a case enclosing the one or more tubular regions and forming a second passageway between an interior surface of the case and the radially outer surface of each tubular region.

5. The heat exchanger of claim 1, wherein the first pattern comprises a plurality of protrusions.

6. The heat exchanger of claim 1, wherein the first pattern comprises a plurality of treads.

7. The heat exchanger of claim 1, wherein the first pattern comprises a textured surface.

8. The heat exchanger of claim 1, wherein the second pattern comprises a plurality of fins.

9. The heat exchanger of claim 1, wherein the second pattern comprises a textured surface.

* * * * *